United States Patent
Cebasek et al.

(10) Patent No.: US 11,662,701 B2
(45) Date of Patent: May 30, 2023

(54) BUILDING AUTOMATION SYSTEM WITH MICROSERVICE ARCHITECTURE TO SUPPORT MULTI-NODE ON-PREMISE BAS SERVER

(71) Applicant: Johnson Controls Technology Company, Auburn Hills, MI (US)

(72) Inventors: Gregory B. Cebasek, New Berlin, WI (US); Joshua A. Edler, Oak Creek, WI (US); Peter J. Hazelberg, Dousman, WI (US); Kunal Saini, Milwaukee, WI (US); Jonathan M. Schwabe, Muskego, WI (US); Matthew T. Trawicki, Franklin, WI (US); Michael G. Welch, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 66 days.

(21) Appl. No.: 17/195,963

(22) Filed: Mar. 9, 2021

(65) Prior Publication Data

US 2021/0191353 A1    Jun. 24, 2021

Related U.S. Application Data

(63) Continuation of application No. 16/254,514, filed on Jan. 22, 2019, now Pat. No. 10,962,946.

(Continued)

(51) Int. Cl.
G05B 19/042        (2006.01)

(52) U.S. Cl.
CPC ............... *G05B 19/042* (2013.01); *G05B 2219/2614* (2013.01); *G05B 2219/2642* (2013.01)

(58) Field of Classification Search
CPC .......... G05B 19/042; G05B 2219/2642; G05B 2219/2614
See application file for complete search history.

(56) References Cited

U.S. PATENT DOCUMENTS

| 2010/0281387 A1 | 11/2010 | Holland et al. |
| 2017/0116241 A1 | 4/2017 | Kumar et al. |

(Continued)

FOREIGN PATENT DOCUMENTS

| KR | 20170016666 A | * | 8/2015 |
| KR | 20180120991 A | * | 4/2017 |

OTHER PUBLICATIONS

U.S. Appl. No. 10/069,941-B2, filed Sep. 4, 2018, Microsoft Technology Licensing, LLC.

(Continued)

*Primary Examiner* — Thomas C Lee
*Assistant Examiner* — Charles Cai
(74) *Attorney, Agent, or Firm* — Foley & Lardner LLP

(57) ABSTRACT

A building automation system (BAS) with microservice architecture. The system includes a server platform configured to perform various operations within the building automation system. The server platform includes a microservices platform configured to execute various processes within the BAS. The microservices platform includes a plurality of nodes where each node is configured to run one or more services as separate processes. The microservices platform further includes a message bus configured to control communication between processes and an orchestration network configured to control communication between the plurality of nodes. The server platform further includes a common data model (CDM) shared between the plurality of nodes where the CDM consists of metadata of the BAS. The server platform further includes a container orchestration (Continued)

platform configured to manage and control the plurality of nodes.

20 Claims, 7 Drawing Sheets

Related U.S. Application Data

(60) Provisional application No. 62/787,209, filed on Dec. 31, 2018.

(56) References Cited

U.S. PATENT DOCUMENTS

| | | |
|---|---|---|
| 2017/0201425 A1 | 7/2017 | Marinelli et al. |
| 2017/0244593 A1 | 8/2017 | Rangasamy et al. |
| 2017/0244787 A1* | 8/2017 | Rangasamy ............ H04L 67/10 |
| 2017/0264493 A1 | 9/2017 | Cencini et al. |
| 2018/0088935 A1* | 3/2018 | Church ............... G06F 11/3051 |
| 2018/0227369 A1 | 8/2018 | Ducray et al. |
| 2018/0376570 A1* | 12/2018 | Verbrugh ............. H05B 47/175 |
| 2019/0149618 A1* | 5/2019 | Tsai ........................ H04L 67/02 709/202 |
| 2019/0171438 A1* | 6/2019 | Franchitti .............. G06N 20/00 |
| 2019/0286078 A1* | 9/2019 | Allmaras ............. G05B 13/042 |
| 2020/0133795 A1* | 4/2020 | Rhodes ............... G06F 11/1469 |
| 2020/0137185 A1 | 4/2020 | Parekh |

OTHER PUBLICATIONS

Amazon Web Services (AWS), "Start Building on AWS Today," URL: https://aws.amazon.com/, Retrieved Jul. 6, 2021, 19 pages.

Docker, "Just Released: Docker Desktop 3.5," URL: https://www.docker.com/, Retrieved Jul. 6, 2021, 8 pages.

Microsoft, "Azure—Invent with Purpose: build what you want, where you want," URL: https://azure.microsoft.com/en-us/, Retrieved Jul. 6, 2021, 10 pages.

Microsoft, "Communication in a microservice architecture," URL: https://docs.microsoft.com/en-us/dotnet/architecture/microservices/architect-microservice-container-applications/communication-in-microservice-architecture, Retrieved Jul. 6, 2021, 8 pages.

* cited by examiner

BUILDING AUTOMATION SYSTEM WITH MICROSERVICE ARCHITECTURE TO SUPPORT MULTI-NODE ON-PREMISE BAS SERVER

CROSS-REFERENCE TO RELATED PATENT APPLICATIONS

This application is a Continuation of U.S. application Ser. No. 16/254,514, filed Jan. 22, 2019, which claims the benefit of and priority to U.S. Provisional Patent Application No. 62/787,209 filed Dec. 31, 2018, both of which are incorporated herein by reference in their entireties.

BACKGROUND

The present disclosure relates generally to building automation systems, and more particularly to the server of the building automation system configured to perform various operations of the system. The present disclosure relates specifically to microservice architecture of the building automation system (BAS) server.

A building automation system (BAS) is, in general, a system of devices configured to control, monitor, and manage equipment in and/or around a building or building area. A BAS can include, for example, a heating, ventilation, and air conditioning (HVAC) system, a security system, a lighting system, a fire alerting system, and any another system that is capable of managing building functions or devices, or any combination thereof. As BAS devices can be installed in any environment (e.g., an indoor area or an outdoor area) and the environment can include any number of buildings, spaces, zones, rooms, or areas. A BAS can include a variety of devices (e.g., HVAC devices, controllers, chillers, fans, sensors, music, lighting, etc.) configured to facilitate monitoring and controlling the building space.

The status of equipment and/or devices within a BAS is typically controlled and monitored by field controllers within the BAS. The field controllers push the corresponding data to a server application that runs monitoring and control software. As the usage of the server application increases, the fault tolerance and scalability decreases. Accordingly, separation of the services provided by the server application is desired.

SUMMARY

One implementation of the present disclosure is a building automation system (BAS). The building automation system includes a server platform configured to perform various operations within the BAS. The server platform includes a microservices platform configured to execute various processes within the BAS. The microservices platform includes a plurality of nodes where each node is configured to run one or more services as separate processes. The microservices platform further includes a message bus configured to control communication processes and an orchestration network configured to control communication between the plurality of nodes. The server platform further includes a common data model (CDM) shared between the plurality of nodes where the common data model consists of metadata of the BAS. The server platform further includes a container orchestration platform configured to manage and control the plurality of nodes. The server platform is on-premise of the building automation system.

In some embodiments, each node includes an endpoint used for communication. In some embodiments, one or more of the plurality of nodes is deployed on a physical server. In some embodiments, one or more of the plurality of nodes is deployed on a cloud server.

In some embodiments, the microservices platform further includes a plurality of microservice containers. In some embodiments, the plurality of microservice containers further includes one or more microservices. In some embodiments, the plurality of microservice containers further includes one or more components of storage used to store data for the one or more microservices.

In some embodiments, the common data model classifies equipment, spaces, devices, and their relationships in the system. In some embodiments, the container orchestration platform is configured to deploy one or more copies of one or more nodes. In some embodiments, the container orchestration platform is configured to monitor the microservices platform for faults.

Another implementation for the present disclosure is a method for implementing microservice architecture in a building automation system (BAS). The method includes decomposing existing server functionality into separate services. The method further includes packaging the separate services into containerization technology. The method further includes employing a container orchestration package where the container orchestration package is configured to monitor, deploy, start, and restart one or more replicas of one or more services. The method further includes restructuring existing databases. The method further includes employing an orchestration virtual private network (VPN) where the orchestration VPN is configured to control networking and communication between services. The method further includes exposing endpoint of each service. The method further includes utilizing a system bus to communicate between processes.

In some embodiments, the method utilizes the orchestration VPN to communicate between a service and an external device. In some embodiments, the method utilizes the orchestration VPN to communicate between a service and an external application on the external device. In some embodiments, restructuring existing databases supports higher throughput of database reads and writes.

In some embodiments, restructuring existing database may not be necessary to implement microservice architecture in the system. In some embodiments, packaging the separate services into containerization technology may include packing the separate services into off-the-shelf containerization technology. In some embodiments, the method further includes adding new server functionality as a new service using containerization technology.

In some embodiments, the endpoint of each service is used for communication between services. In some embodiments, the endpoint of each service is used for communication between the service and external applications. In some embodiments, the method if performed by the server of the building automation server.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

As described above, field controllers within a building automations system (BAS) can push corresponding data to a server application that runs monitoring and control software. Further, the collected data can be stored in a server database. However, having a single server application for the BAS provides a one-point of access for failure. For example, if the application goes down, every part of the application is down (i.e. the user interface, ingestion of site alarms, audits and time series data, scheduled tasks, etc.). The demand on the server application may be too great due to engines or users so a customer may need to buy more hardware and move their deployment from the old server to the new server. This hardware can be very costly. By decomposing the functionality of the server application into a set of separate services, the system will obtain scalability and fault-tolerance benefits. The separate services can be installed, or deployed, independently to different servers. This architecture allows for the server application to accommodate more users and more field controllers than when utilizing a single server.

The present disclosure includes systems and methods for microservice architecture for a building automation system (BAS) server. In some embodiments, the present disclosure provides scalability and fault-tolerance for the server of a building automation system (BAS).

Building HVAC Systems and Building Automation Systems

Figure 1:
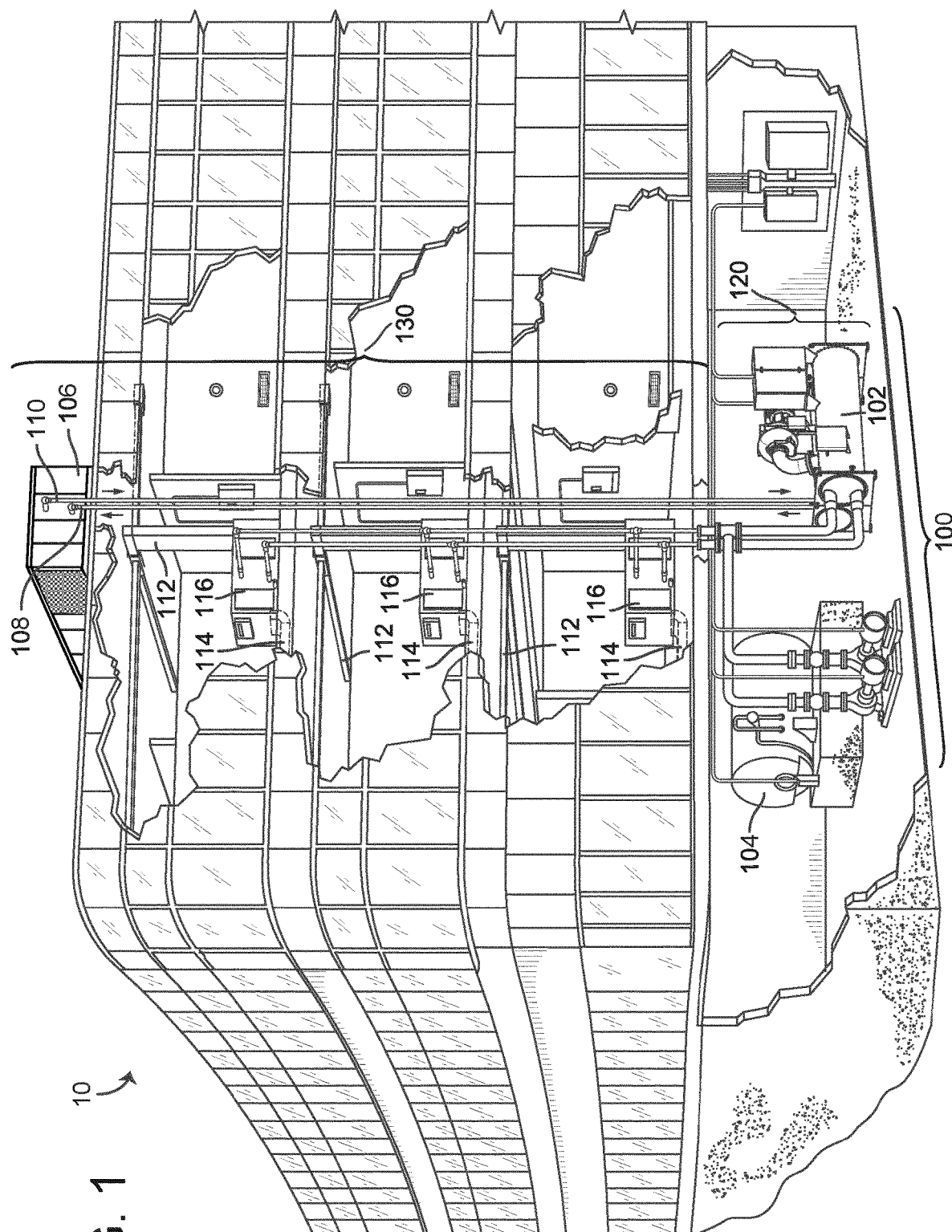
FIG. 1 is a drawing of a building equipped with a HVAC system, according to some embodiments.
Figure 2:
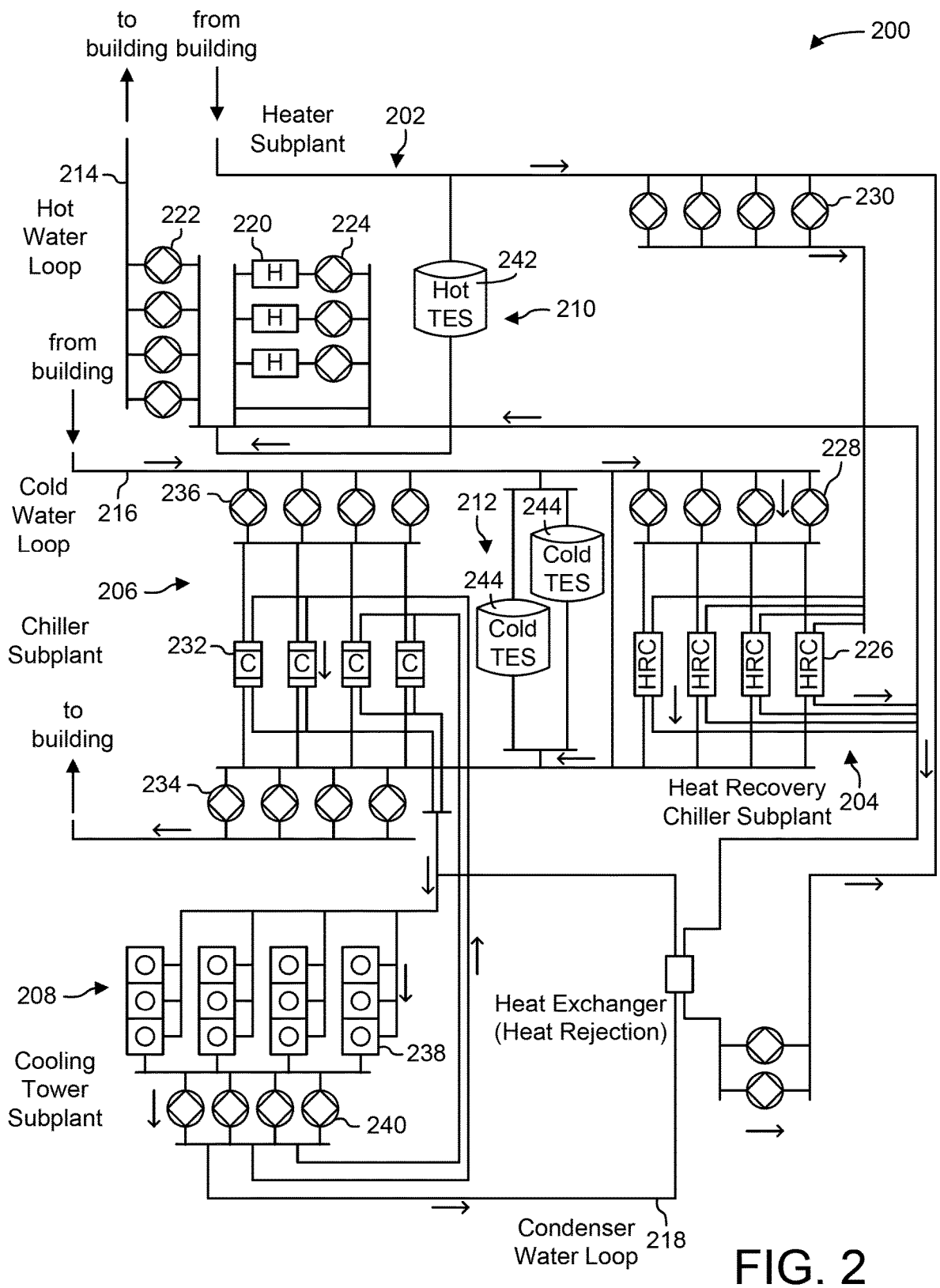
FIG. 2 is a block diagram of a waterside system which can be used to serve the building of FIG. 1, according to some embodiments.
Figure 3:
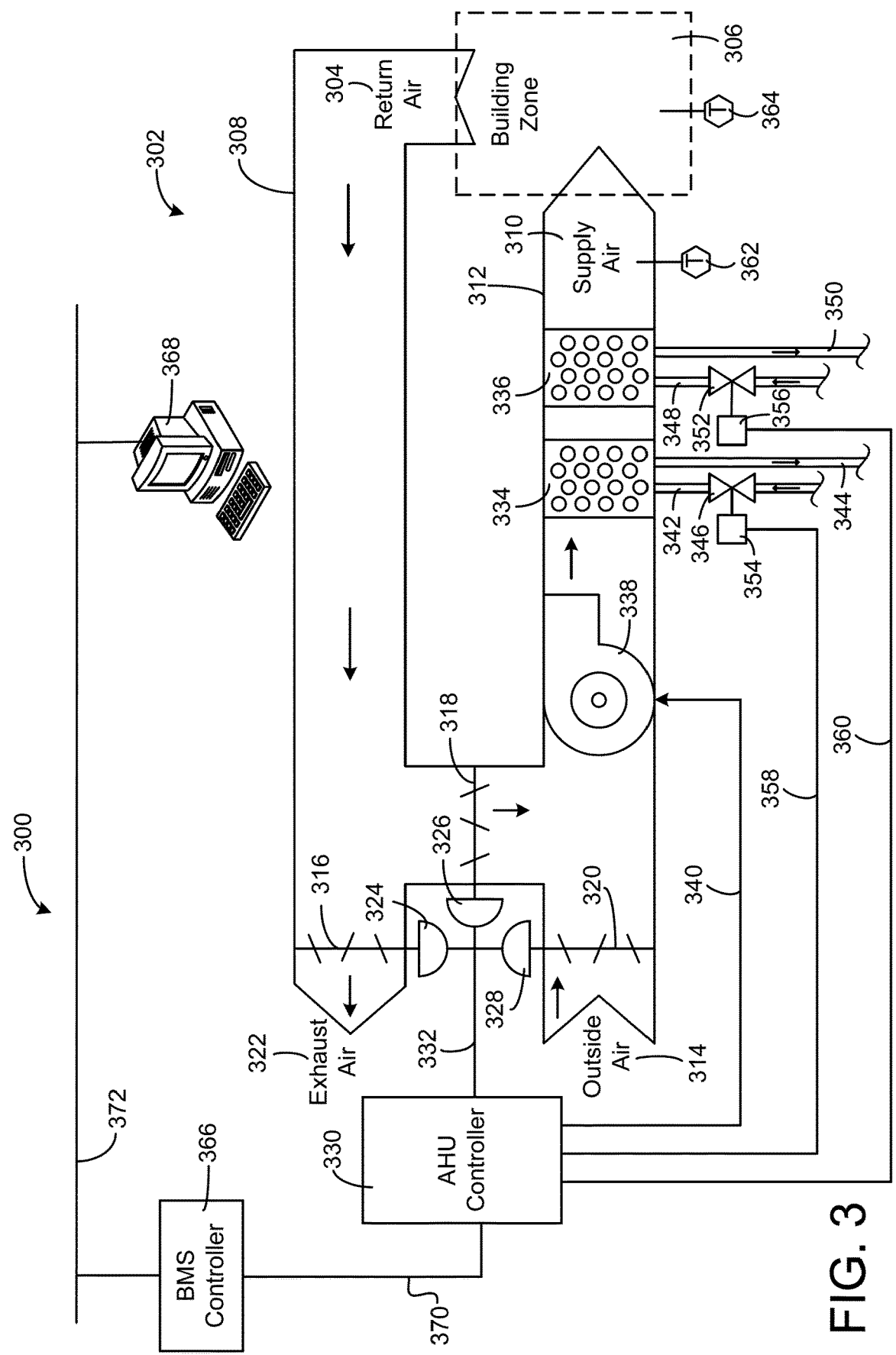
FIG. 3 is a block diagram of an airside system which can be used to serve the building of FIG. 1, according to some embodiments.
Figure 4:
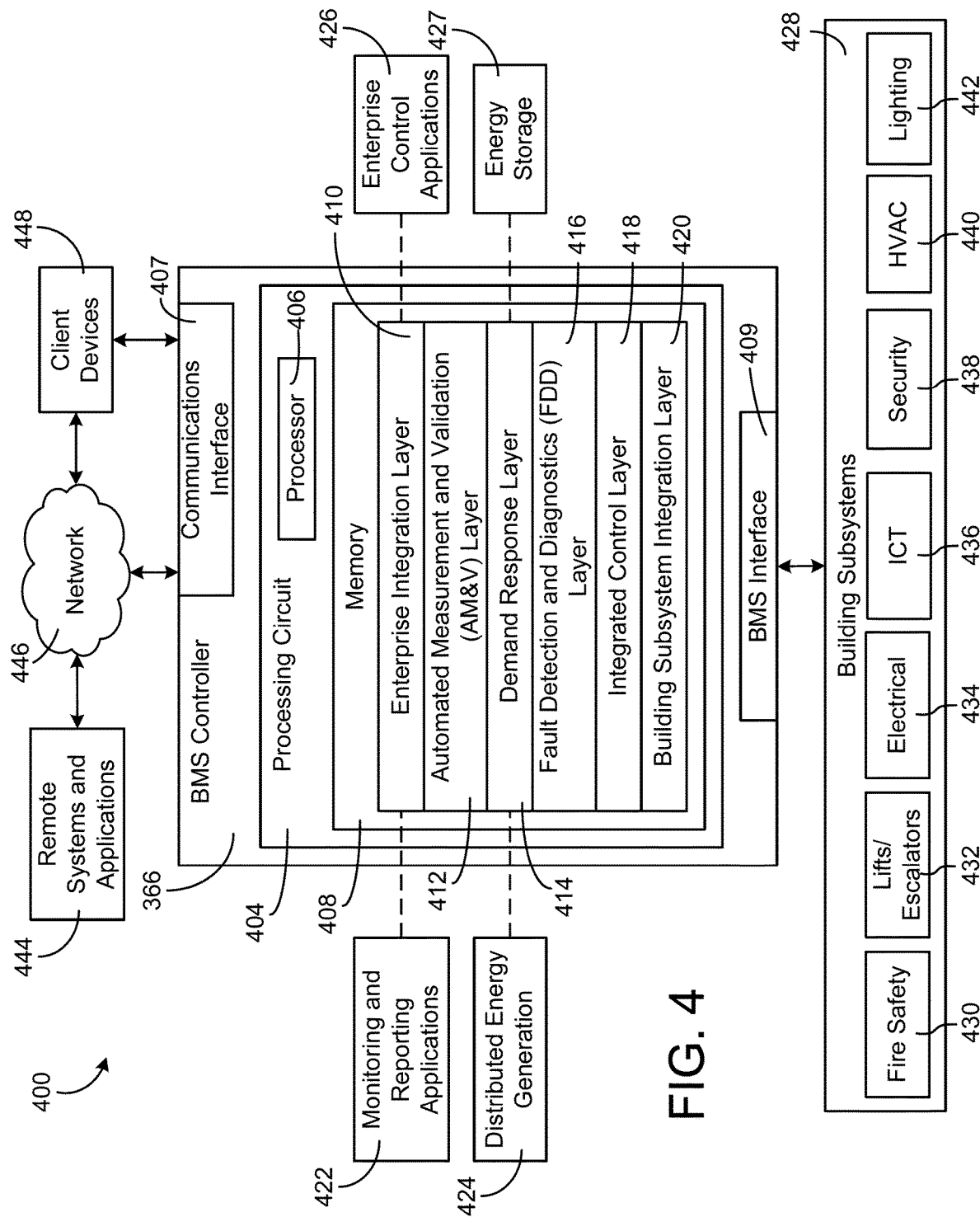
FIG. 4 is a block diagram of a building automation system (BAS) which can be used to monitor and control the building of FIG. 1, according to some embodiments.

Referring now to FIGS. 1-4, several building automation systems (BAS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BAS which can be used to monitor and control building 10.

Building and HVAC System

Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes a HVAC system 100. HVAC system 100 can include a number of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a number of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a number of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a number of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a number of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a number of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360.

Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and can correlate with the amount of energy consumed to achieve a desired supply air temperature. AHU 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Building Automation Systems

Referring now to FIG. 4, a block diagram of a building automation system (BAS) 400 is shown, according to some embodiments. BAS 400 can be implemented in building 10 to automatically monitor and control various building functions. BAS 400 is shown to include BAS controller 366 and a number of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a number of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a number of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Microservice Architecture for BAS Server

Figure 5:
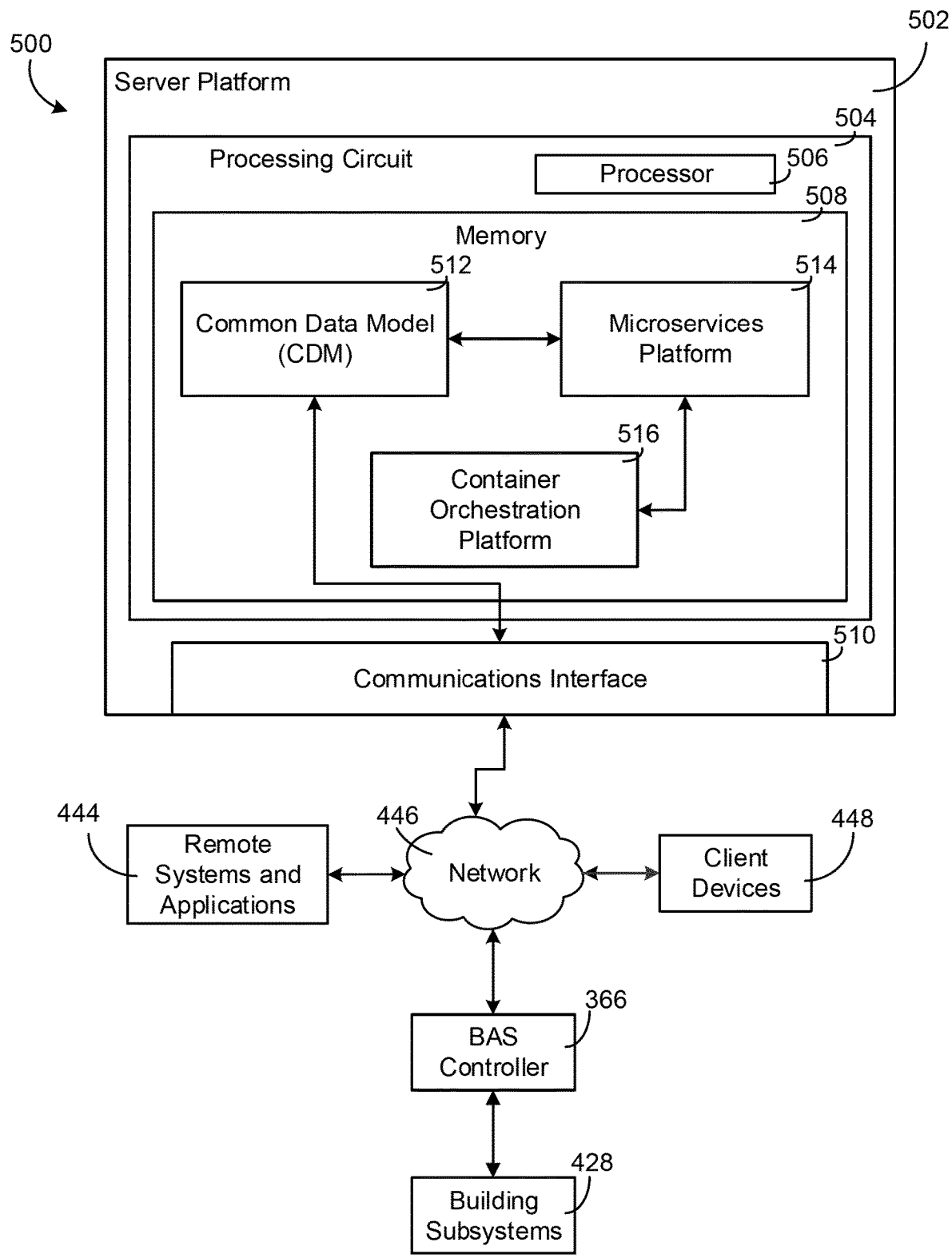
FIG. 5 is a block diagram of a server platform which can be used to perform various operations of the building of FIG. 1, according to some embodiments.
Figure 6:
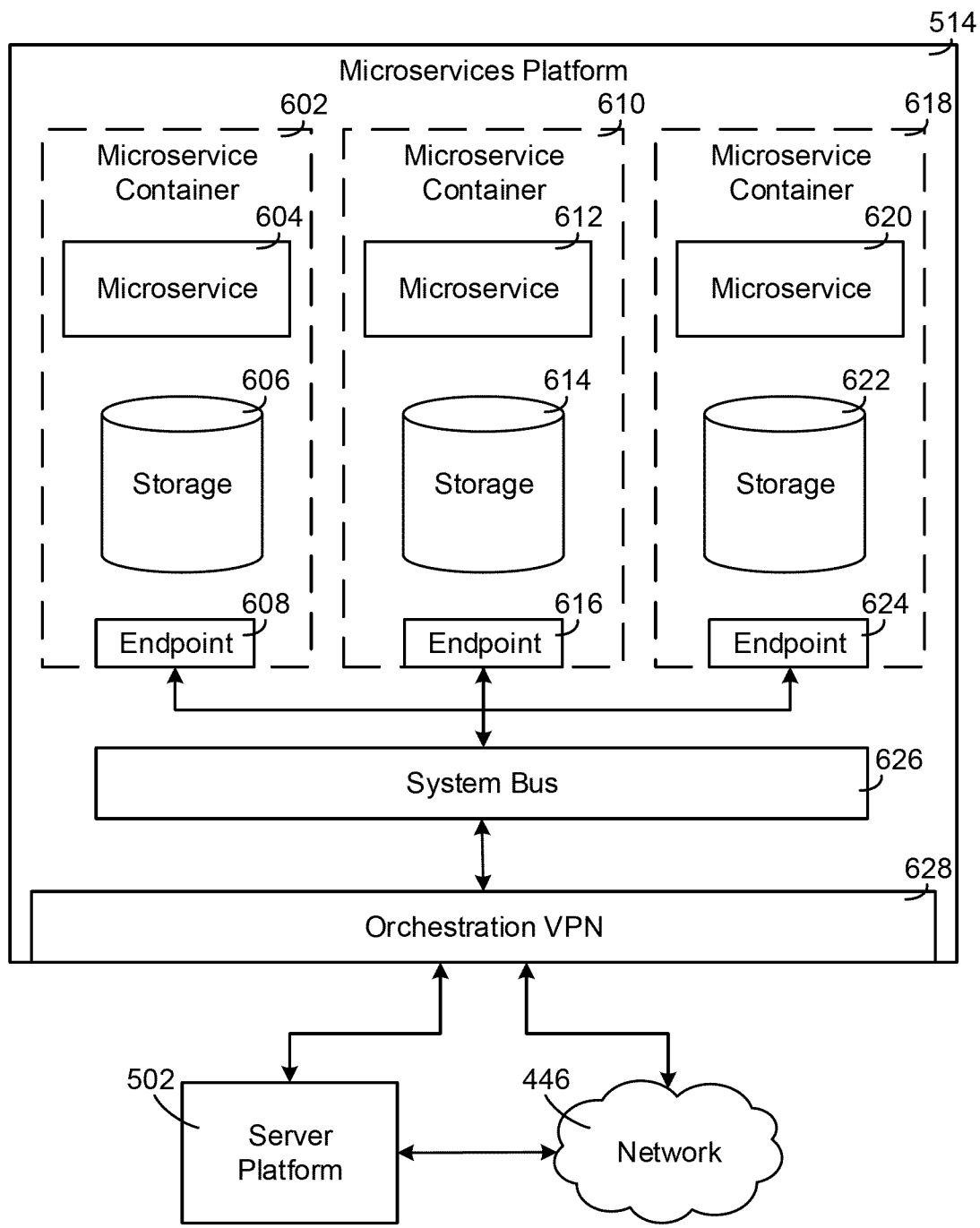
FIG. 6 is a block diagram of microservices platform of FIG. 5, according to some embodiments.
Figure 7:
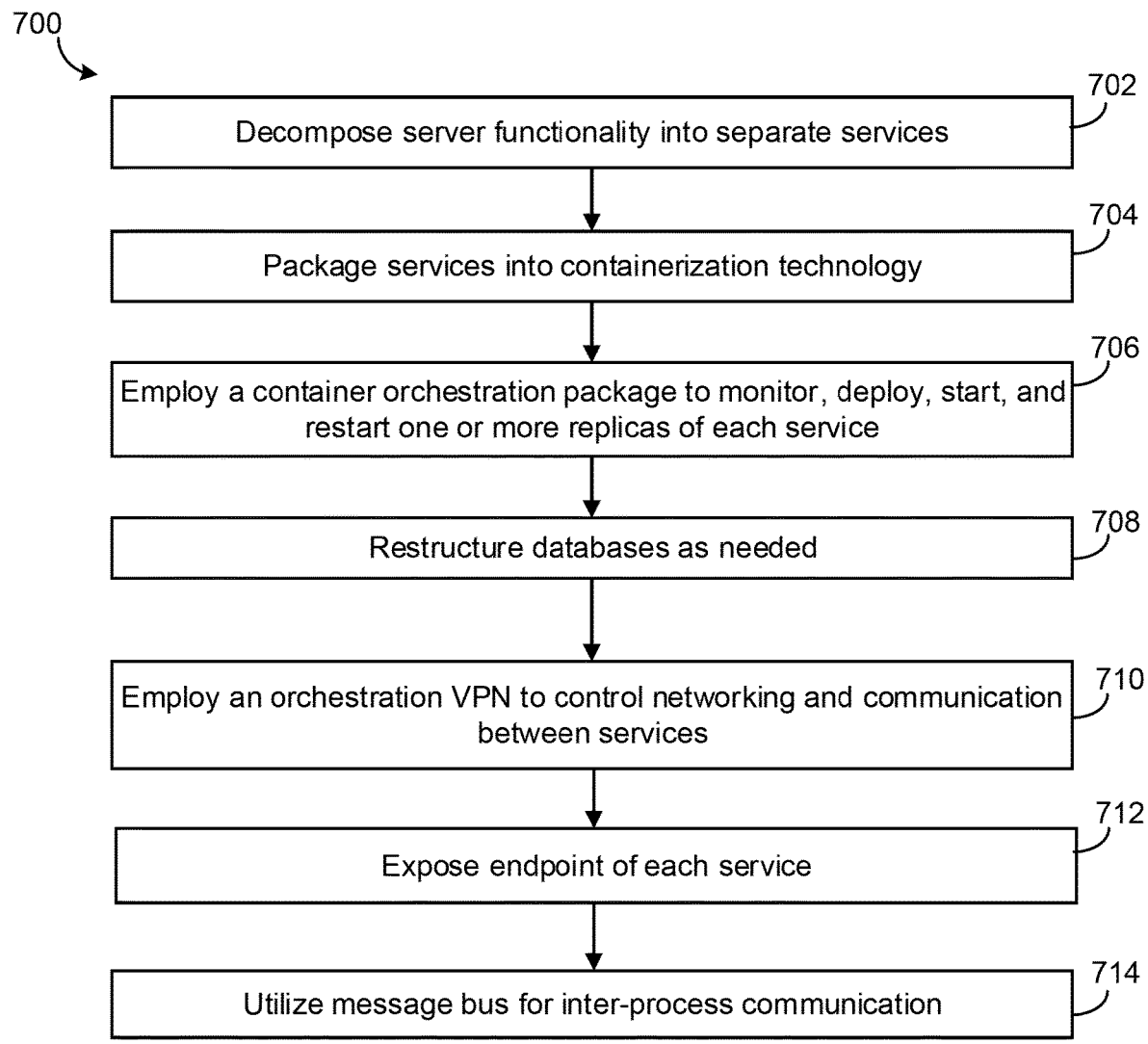
FIG. 7 is a flow diagram for implementing microservice architecture in a building automation system (BAS), according to some embodiments.

As described above, the present disclosure includes systems and methods that provide microservice architecture to support a multi-node on-premise BAS server in a building automation system (BAS). FIG. 5-7 show various embodiments of the present disclosure.

Referring now to FIG. 5, a block diagram of a server platform which can be used to perform various operations of the building of FIG. 1 is shown, according to some embodiments. System 500 is shown to include a server platform 502, a network 446, remote systems and applications 444, client devices 448, BAS controller 366, and building subsystems 428. System 500 may be used to execute the various services of the BAS server as separate processes.

As shown by FIG. 5, server platform 502 is shown to include a processing circuit 504 including a processor 506 and memory 508. Processing circuit 504 can be communicably connected to communications interface 510 such that processing circuit 504 and the various components thereof can send and receive data via interface 510. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

Still referring to FIG. 5, memory 508 is shown to include common data model (CDM) 512, microservices platform 514, and container orchestration platform 516. The following paragraphs describe the functionality of common data model 512, microservices platform 514, and container orchestration platform 516 in greater detail.

Memory 508 of server platform 502 is shown to include common data model (CDM) 512. Common data model 512 can be configured to define all of the equipment and their various relationships of the building automation system. The common data model 512 may be metadata that classifies equipment, spaces, networked devices, and their relationships in the building automation system. Common data model 512 may also include other concept in the domain of the building. For example, common data model 512 may include users, user information, data points, control login, alarms, and/or audits. Common data model 512 can be configured to be available to all microservices of microservices platform 514. In some embodiments, all microservices of microservices platform 514 can read, or access, the same data from common data model 512. Common data model 512 may include one or more database to store the metadata. In certain embodiments, the common data model 512 may be a list, XML files, and/or enumerator. The common data model 512 may be dynamic as attributes of the BAS change. In some embodiments, common data model 512 can also be in a document, object, or graph database, for instance where the relationship is queried easier and more efficiently.

Still referring to FIG. 5, memory 508 of server platform 502 is shown to include microservices platform 514. Microservice platform can be configured to access metadata via common data model 512 and/or handle microservices via container orchestration platform 516. Microservices platform 514 is described in greater detail with reference to FIG. 6.

Memory 508 of server platform 502 is shown to include container orchestration platform 516. Container orchestration platform 516 can be configured to communicate with microservices platform 514. Container orchestration platform 516 may communicate with microservices platform 516 to monitor, deploy, start, and/or restart one or more replicas of one or more microservices of microservices platform 516. In some embodiments, container orchestration platform 516 may deploy multiple copies of an individual microservice of microservices platform 514. For example, if the BAS is being flooded with alarms, one or more copies of the alarm ingestion service may be started up and run on another microservice container of microservices platform 514.

Still referring to FIG. 5, server platform 502 is shown to include a communications interface 510. Interface 510 may facilitate communications between server platform 502 and network 446, as well as external applications (remote systems and applications 444, BAS controller 366, applications residing on client devices 448, etc.) for performing various services of server platform 502. Interface 510 may also facilitate communications between server platform 502 and client devices 448.

Communications interface 510 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interface 510 can be direct (e.g., local wired or wireless communications) or via a communications network (e.g., a WAN, the Internet, a cellular network, etc.). For example, interface 510 can include an Ethernet card and port for sending and receiving data via an Ethernet-based communications link or network. In another example, interface 510 can include a Wi-Fi transceiver for communicating via a wireless communications network. In another example, interface 510 can include cellular or mobile phone communications transceivers. In one embodiment, communications interface 510 is a power line communications interface. In other embodiments, communications interface 510 and is an Ethernet interfaces.

Referring now to FIG. 6, microservices platform 514 of FIG. 5 is shown is greater detail, according to some embodiments. Microservices platform 514 can contain a plurality of microservice containers (i.e. microservice container 602, microservice container 610, and/or microservice container 618), a system bus 626, and/or an orchestration VPN 628. Microservices platform 514 may communicate with server platform 502 and/or network 446 via orchestration VPN 628.

Microservices platform 514 is shown to include one or more microservice containers 602, 610, and/or 618. In some embodiments, microservices platform 514 can include a single microservice container 602. In certain embodiments, microservices platform 514 can include a plurality of microservice containers (i.e. microservice containers 602, 610, 618, etc.). Microservice containers 602, 610, and/or 618 can be deployed by container orchestration platform 516 of server platform 502. Microservice containers 602, 610, and/or 618 may include one or more storages 606, 614, and/or 622. Storages 606, 614, and/or 622 may be a database used to store data used by microservices 604, 612, and/or microservices 622. Microservices 604, 612, and/or 622 may access data from storages 606, 614, and/or 622 to perform their functions. Microservice containers 602, 610, and/or 618 may be responsible for a variety of services. The services may be, but are not limited to, an alarm service, an audit service, a time series service, a scheduling service, a reporting service, and/or a configuration service.

Microservice containers 602, 610, and/or 618 can include endpoints 608, 616, and/or 624. Endpoints 608, 616, and 624 can be configured to allow communication with the respective microservice containers. Endpoints 608, 616, and/or 624 may expose an application programming interface (API). Endpoints 608, 616, and/or 624 may be accessed via Hyper Text Transfer Protocol Secure (HTTPS) and/or Hyper Text Transfer Protocol (HTTP). Endpoints 608, 616, and/or 624 may be used to communicate on system bus 626 and/or orchestration VPN 628.

Microservices platform 514 is shown to include system bus 626. System bus 626 may be configured to facilitate inter-process communication with microservice containers 602, 610 and/or 618. System bus 626 may access microservice containers 602, 610, and/or 618 via endpoints 608, 616, and/or 626. System bus 626 may utilize a network protocol (i.e. IP, TCP<HTTP, etc.) for communication. System bus 626 may allow communication between one or more processes.

Still referring to FIG. 6, microservices platform 514 is shown to include orchestration VPN 628. Orchestration VPN can be configured to allow components and/or microservices to send and/or receive data across networks and devices. Orchestration VPN 628 can be configured to facilitate communication between microservices platform 514 and server platform 502 and/or network 446. For example, microservice 604 of microservice container 602 may request data from common data model 512 of server platform via orchestration VPN 628. In some embodiment, microservice 612 of microservice container 610 may perform a function on a building subsystem 428 through network 446 via orchestration VPN 628.

Referring now to FIG. 7, a process 700 for implementing microservice architecture in a building automation system is shown, according to some embodiments. The server platform 502, the microservices platform 514, and/or the container orchestration platform 516 are configured to perform the process 700 in some embodiments. Furthermore, microservice container 602, microservice 604, system bus 626, and/or orchestration VPN 628 are configured to perform the process 700 in some embodiments. Any component of system 500 may be configured to perform the process 700. Any computing device as described herein can be configured to perform the process 700.

In step 702, the server functionality can be decomposed into separate services. For example, the functionality of server platform 502 can be decomposed into one or more microservice containers 602, 610, and/or 618 of microservices platform 514. For instance, there may be a microservice container 602 containing a microservice 604 responsible for an alarm service. Furthermore, there may be a microservice container 610 containing a microservice 612 responsible for a scheduling service.

In step 704, services can be packaged into containerization technology. For example, the container orchestration platform 516 can package the functionality of service platform into one or more microservice containers 602, 610, and/or 618 of microservices platform 514. The functionality, or microservices 604, 612, and/or 620 can be packaged into microservice containers 602, 610, and/or 618.

In step 706, a container orchestration package can be employed to monitor, deploy, start, and restart one or more replicas of each server. For example, container orchestration platform 516 may be configured to monitor, deploy, start, and/or restart one or more replicas of microservices 604, 612, and/or 620 in microservice containers 602, 610, and/or 618. In some embodiments, container orchestration platform 516 may restart microservice 604 of microservice container 602 upon failure.

In step 708, the databases can be restructure as necessary. In some instances, databases may need to be restructured to support higher throughput of database reads and writes in the building automation system. Database restructuring may be performed by server platform 502 and/or network 446.

In step 710, an orchestration virtual private network (VPN) can be employed to control networking and communication between servers. For example, microservice 604 of microservice container 602 may utilize orchestration VPN 628 to communicate with components of server platform 502, such as container orchestration platform 516. In some embodiments, the orchestration VPN may be a Docker VPN. In certain embodiments, the orchestration VPN 628 may be utilized by microservice container 610 to communicate with network 446, BAS controller 366, remote systems and applications 444, and/or client devices 448. Orchestration VPN 629 can be a network (i.e. a public network, a private network, etc.) configured to facilitate communication, for example via Hyper Text Transfer Protocol Secure (HTTPS) and/or Hyper Text Transfer Protocol (HTTP).

In step 712, the endpoint of each service can be exposed. For example, endpoints 608, 616, and/or 624 may be exposed for microservice containers 602, 610, and/or 618. Endpoints 608, 616, and/or 624 may be used for communication. Endpoints 608, 616, and/or 624 may expose an application programming interface (API). Endpoints 608, 616, and/or 624 may be accessed via Hyper Text Transfer Protocol Secure (HTTPS) and/or Hyper Text Transfer Protocol (HTTP).

In step 714, the message bus can be utilized for inter-process communication. For example, system bus 626 may be used for inter-process communication within microservices platform 514. For instance, microservice 604 of microservice container 602 may communicate with microservice 612 of microservice container 610 via system bus 626. System bus 626 may utilize endpoints 608, 616, and/or 624 for communication.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

1. A building automation system (BAS), the BAS system comprising:
   a microservices platform comprising processing circuitry configured to execute various processes within the BAS, the microservices platform comprising:
      a plurality of nodes comprising processing circuitry configured to run one or more services as separate processes;
      a message bus configured to control communication between the separate processes; and
      an orchestration network configured to control communication between the plurality of nodes;
   a common data model (CDM) shared between the plurality of nodes and used by the one or more services run on the plurality of nodes wherein the CDM comprises metadata of the BAS, the metadata defining a plurality of relationships between physical equipment, spaces, and networked devices of the BAS; and
   a container orchestration platform comprising processing circuitry configured to manage and control the plurality of nodes.

2. The BAS of claim 1, wherein each of the plurality of nodes is communicably accessible by an application programming interface (API) for communication.

3. The BAS of claim 1, wherein one or more of the plurality of nodes are deployed on at least one physical server and wherein the physical server is on a premise of the BAS.

4. The BAS of claim 1, wherein one or more of the plurality of nodes are deployed on at least one cloud server.

5. The BAS of claim 1, the microservices platform further comprising a plurality of microservice containers.

6. The BAS of claim 5, wherein the plurality of microservice containers comprise one or more microservices.

7. The BAS of claim 6, wherein the plurality of microservice containers comprise one or more computer readable memory devices used to store data for the one or more microservices.

8. The BAS of claim 1, wherein the CDM classifies data relating to the BAS.

9. The BAS of claim 1, wherein the container orchestration platform is configured to deploy one or more copies of one or more of the plurality of nodes.

10. The BAS of claim 1, wherein the container orchestration platform is configured to monitor the microservices platform for faults.

11. A server for a building automation system (BAS), the server comprising processing circuitry configured to implement:
   a microservices platform configured to execute various processes within the BAS, the microservices platform comprising:
   a plurality of nodes configured to run one or more services as separate processes; and
   an orchestration network configured to control communication between the plurality of nodes;
   a common data model (CDM) shared between the plurality of nodes and used by the one or more services run on the plurality of nodes wherein the CDM comprises metadata of the BAS, the metadata defining a plurality of relationships between physical equipment, spaces, and networked devices of the BAS; and
   a container orchestration platform configured to manage and control the plurality of nodes.

12. The server of claim 11, wherein the server is on a premise of the BAS and the orchestration network is a virtual private network (VPN).

13. A building automation system (BAS), the BAS system comprising:
   building equipment configured to operate to affect environmental conditions of a plurality of spaces of a building;
   a microservices platform comprising processing circuitry configured to execute various processes within the BAS, the microservices platform comprising a plurality of nodes comprising processing circuitry configured to run one or more services as separate processes;
   a common data model (CDM) shared between the plurality of nodes and used by the one or more services run on the plurality of nodes wherein the CDM comprises metadata of the BAS, the metadata defining a plurality of relationships between the building equipment, spaces, and networked devices of the BAS; and
   a container orchestration platform comprising processing circuitry configured to manage and control the plurality of nodes.

14. The BAS of claim 13, wherein each of the plurality of nodes include an application program interface (API) for communication.

15. The BAS of claim 13, wherein the one or more services comprise at least one of an alarm service for the building, a scheduling service for the building, a reporting service for the building, or a configuration service for the building.

16. The BAS of claim 13, wherein one or more of the plurality of nodes are deployed on a remote server, and one or more of the plurality of nodes are deployed on a server that is on a premise of the building.

17. The BAS of claim 13, wherein the microservices platform further comprising a virtual proxy network (VPN) configured to control communication between the plurality of nodes.

18. The BAS of claim 13, wherein the CDM is a dynamic model that is configured to dynamically adjust as attributes of the BAS change.

19. The BAS of claim 13, wherein the CDM further comprises information regarding users, data points, control login, and alarms of the building.

20. The BAS of claim 13, wherein the CDM defines relationships between a plurality of devices of the building equipment.

* * * * *